Patented Dec. 17, 1946

2,412,933

UNITED STATES PATENT OFFICE 2,412,933

CONTROL SYSTEM

Ralph H. Wright, Edgewood, and Earl C. Watson, Wilkinsburg, Pa., assignors to Westinghouse Electric Corporation, East Pittsburgh, Pa., a corporation of Pennsylvania Application February 3, 1943, Serial No. 474,500

14 Claims. (Cl. 171—223)

Our invention relates, generally, to control systems, and, more particularly, to control systems for controlling the load distribution or division between dynamo-electric machines.

When, for example, two dynamo-electric machines are connected to drive or supply a common load, it is necessary that some means be provided for maintaining a predetermined or desired division of the load between the machines to prevent overloading one of the machines. Heretofore, proper load distribution between such dynamo-electric machines has been obtained by the use of cross connected series or compounding field windings; however such apparatus is expensive to manufacture due to the heavy series field windings required and its operation entails a considerable power loss, since the series field windings carry the full armature current. In addition the resistance losses have an appreciable effect on the efficiency of the machines.

An object of our invention is to provide a control system for a plurality of dynamo-electric machines which shall function to divide the load between the machines automatically in any desired proportion or ratio, which shall be simple and efficient in operation, and which shall be inexpensive to manufacture, install, operate and maintain.

A more specific object of our invention is to provide for maintaining a predetermined division of load between dynamo-electric machines without the use of cross-connected series or compounding field windings.

A further object of our invention is to provide for maintaining a predetermined division of load between dynamo-electric machines connected to a common load by utilizing an auxiliary generator functioning as a regulating device to vary the excitation of the main field windings of the machines in accordance with any variation in their respective loads from a predetermined load ratio.

Figure 1:
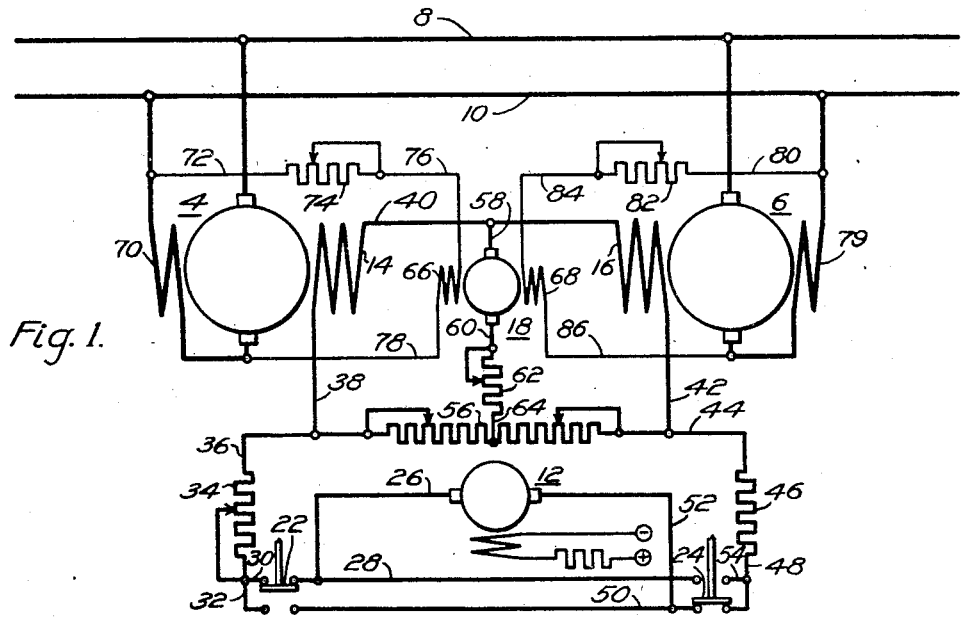
Figure 2:
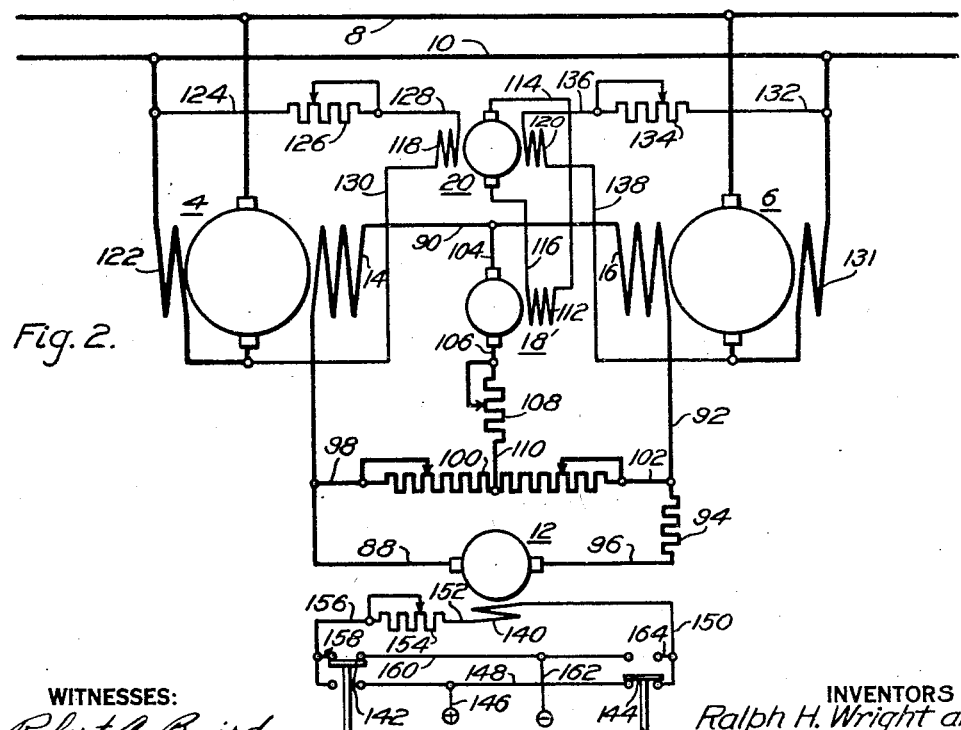

These and other objects and advantages of the invention will be apparent from the following detailed description taken in connection with the accompanying drawing, in which:

Figures 1 and 2 are diagrammatic illustrations of control systems for dynamo-electric machines embodying the principal features of the invention, and in which like reference characters designate like elements in the two figures.

In practicing the invention, the dynamo-electric machines 4 and 6, which may be either motors or generators, but which, for convenience of description of the invention, will be considered as generators hereinafter, are connected in parallel circuit relation to a power bus comprising conductors 8 and 10.

A continuously driven exciter generator 12 is connected to energize the main field windings 14 and 16 of the main generators 4 and 6 and an auxiliary generator 18 is excited in accordance with the difference between the loads on the generators to so control the energization of the main field windings 14 and 16 as to produce the desired load division between the generators. In the embodiment of the invention of Fig. 2, a pilot generator 20 is provided for exciting the auxiliary generator 18.

Considering the invention more in detail, in the embodiment of the invention of Fig. 1, numerals 22 and 24 designate contact elements which may be actuated in any well-known manner to reverse the connections between the exciter generator 12 and the main field windings 14 and 16 of the generators 4 and 6. When the contact elements 22 and 24 are in the position shown in the drawing with the contact element 22 in upper contact position and the contact element 24 in lower contact position, the field windings 14 and 16 will be energized in a circuit which extends from a terminal of the armature of the generator 12, through conductors 26 and 28, the contact element 22, conductors 30 and 32, a variable resistor 34, conductors 36 and 38, the field winding 14, a conductor 40, the field winding 16, conductors 42 and 44, a ballast resistor 46, a conductor 48, the contact element 24 and conductors 50 and 52 to the other terminal of the armature of the generator 12.

When it is desired to reverse the direction of rotation of machinery connected to be energized by the generators 4 and 6, the polarity of the generators 4 and 6 may be reversed by moving the contact element 22 to lower contact position and raising the contact element 24 to upper contact position. The exciter generator 12 will then be connected to cause exciting current to flow in the opposite direction in the windings 14 and 16 in a circuit which extends from one terminal of the armature of the exciter 12, through conductors 26 and 28, the contact element 24, conductors 54 and 48, the ballast resistor 46, the conductors 44 and 42, the field winding 16, the conductor 40, the field winding 14, the conductors 38 and 36, the variable resistor 34, the conductor 32, the contact element 22 and conductors 50 and 52 to the other terminal of the armature of the exciter 12.

When the excitation of the generators 4 and

Dec. 17, 1946.   R. H. WRIGHT ET AL   2,412,933

CONTROL SYSTEM

Filed Feb. 3, 1943

WITNESSES:
Robert C. Baird
Joe Weber.

INVENTORS
Ralph H. Wright and
Earl C. Watson
BY
ATTORNEY verse the polarity of the potential applied to the conductors 8 and 10 by the main generators 4 and 6, the direction of flow of current in the field windings 14 and 16 may be reversed by moving the contact element 142 to the lower contact position and the contact element 144 to the upper contact position to thus reverse the excitation and, therefore, the polarity of the output potential of the exciter generator 12. With the contact element 142 in lower contact position and the contact element 144 in the upper contact position, the energizing circuit for the field winding 140 extends from positive potential, through the conductors 146 and 148, the conductor 156, the variable resistor 154, the conductor 152, the winding 140, the conductor 150, a conductor 164, the contact element 144 and the conductors 160 and 162 to negative potential.

In the operation of the embodiment of the invention of Fig. 2, the pilot generator 20 will be effected by variations in load on the main generators 4 and 6 in the manner described in connection with the functioning of the auxiliary generator 18 in the embodiment of the invention of Fig. 1. The pilot generator 20 will thus cause variations in the excitation and, therefore, the output potential of the auxiliary generator 18' in accordance with variations in the loads on the main generators 4 and 6, and the auxiliary generator 18' will function to compensate for variations in loads on the main generators 4 and 6 by varying the current flowing in the field windings 14 and 16, as described hereinabove.

In the embodiment of the invention of Fig. 1, any desired variation of the output potentials of the main generators 4 and 6 may be had by adjustment of the variable resistor 34 which is connected in the energizing circuit of the field windings 14 and 16. In this embodiment of the invention, the energizing circuit of the field windings 14 and 16 is open when it is desired to reverse the exciting current in these field windings, and it is, therefore, necessary that the resistor 56 have a comparatively low resistance value in order to retard the discharge of the field windings 14 and 16. In the embodiment of the invention of Fig. 2, in which the reversal of exciting current in the field windings 14 and 16 is accomplished by reversing of the polarity of the exciting current of the exciter generator 12, the generator 12 and the ballast resistor 94 are not disconnected from the field windings 14 and 16 when the exciting current is to be reversed and, therefore form part of the discharge circuit for the field windings 14 and 16. Under these conditions, it is desirable that the resistor 100 be of a comparatively high value to prevent power loss in the resistor and the high value of the resistance of the resistor 100 requires that the auxiliary generator 18' generate potentials of higher value than the auxiliary generator 18 in the embodiment of the invention of Fig. 1. The pilot generator 20 is, therefore, provided as an amplifying device to produce greater variations in the excitation of the auxiliary generator 18' as a result of variations in the energization of the field windings 118 and 120 than could be provided if the opposed field windings were applied directly to the auxiliary generator 18'.

In the embodiment of the invention of Fig. 2, variations of the output potential of the main generators 4 and 6 may be made by adjustment of the variable resistor 154.

The main generators 4 and 6 are shown connected to the same conductors 8 and 10 to thereby supply a common load which may be connected to the conductors 8 and 10. It is to be understood that the generators may be connected to separate loads and the system will then function to maintain any desired proportion between the loads on the two generators.

It is further to be understood that the machines 4 and 6 may be motors connected to either a common load or two separate loads. If the machines 4 and 6 are motors, the polarity of the auxiliary generators 18 and 18' will be reversed to provide the proper compensation for unbalance of loads on the motors. Thus, in the embodiment of the invention of Fig. 1, when the machine 4 acting as a motor assumes a greater portion of the load than is desired, its armature current will increase and the field windings 66 of the auxiliary generator 18 will cause the generator 18 to generate a potential in such a direction as to increase the exciting current flowing in the field winding 14 and decrease the exciting current flowing in the field winding 16 to thereby cause the motor 6 to pick up more load and the motor 4 to drop load. The auxiliary generator 18' in the embodiment of the invention of Fig. 2 will function in the same manner to maintain the desired proportion between the loads on the machines 4 and 6 functioning as motors.

It will be seen that we have provided a control system for a plurality of dynamo-electric machines which shall function to divide the load between the machines automatically in any desired proportion, and which shall be simple and efficient in operation and inexpensive to manufacture, install, operate and maintain.

In compliance with the requirements of the patent statutes, we have shown and described herein the preferred embodiments of our invention. It is to be understood, however, that the invention is not limited to the precise construction shown and described, but is capable of modification by one skilled in the art, the embodiments herein shown being merely illustrative of the principles of our invention.

We claim as our invention:

1. In a control system for a plurality of dynamo-electric machines, means connecting the field windings of the machines to a source of power in series circuit relation, a resistor connected in shunt circuit relation to the part of the series circuit which includes the field windings, an auxiliary generator, circuit means connecting the auxiliary generator between a point in the series circuit between the field windings and a point on the resistor intermediate its ends, and means for exciting the auxiliary generator in accordance with the variation from a predetermined ratio of the loads of the machines.

2. In a control system, a pair of main generators connected in parallel circuit relation to supply a common load, a source of excitation potential, circuit means connecting the field windings of the generators to the source of excitation potential in series circuit relation, a resistor, means connecting the resistor in shunting relation with the circuit including the field wndings, an auxiliary generator, means connecting the auxiliary generator in circuit between the connection between the field windings and a point intermediate the ends of the resistor, and means exciting the auxiliary generator in accordance with the difference between the actual load ratio and the predetermined load ratio of the main generators.

3. In a control system, a pair of main generators connected in parallel circuit relation to supply a common load, a source of excitation potential therefor, circuit means connecting the field windings of the generators to the source of excitation potential in series circuit relation, a resistor, means connecting the resistor in shunting relation with the circuit including the field windings, an auxiliary generator having opposed field windings, means connecting the auxiliary generator in circuit between the connection between the field windings and a point intermediate the ends of the resistor, and means energizing the separate opposed field windings of the auxiliary generator in accordance with the loads on the separate main generators respectively.

4. In a control system for a pair of main generators, a first auxiliary generator, circuit means connecting the first auxiliary generator for selectively increasing the excitation of one of the main generators while decreasing the excitation of the other main generator in accordance with the polarity of excitation of the first auxiliary generator, a second auxiliary generator having opposed field windings, means for separately energizing the opposed field windings in accordance with the loads on the separate main generators, and circuit means whereby the first auxiliary generator is excited by the second auxiliary generator.

5. In a control system for a pair of main generators, a first auxiliary generator, circuit means connecting the first auxiliary generator for selectively increasing the excitation of one while decreasing the excitation of the other of the main generators in accordance with the polarity of excitation of the first auxiliary generator, a second auxiliary generator, means for exciting the second auxiliary generator with a polarity dependent upon which of the main generators is carrying a greater amount of load relative to the other main generator as determined by a predetermined load ratio, and circuit means whereby the first auxiliary generator is excited by the second auxiliary generator.

6. In a control system for two main generators, an exciting generator, circuit means connecting the field windings of the main generators to the exciting generator in series circuit relation, circuit control means for reversing the polarity of the exciting generator connections with respect to the main generator field windings to thereby reverse the polarity of the main generators, a discharge circuit for the main generator field windings comprising a resistor connected in shunting relation with the main field windings, an auxiliary generator, circuit means connecting the auxiliary generator in a circuit extending from the connection between the field windings to a point intermediate the ends of the discharge resistor, and means for exciting the auxiliary generator in amount and polarity dependent upon the amount and direction of variation of the loads on the main generators from a predetermined load ratio.

7. In a control system for two main generators, an exciting generator, circuit means connecting the field windings of the main generators to the exciting generator in series circuit relation, circuit control means for reversing the potential of the exciting generator with respect to the main generator field windings to thereby reverse the polarity of the main generators, a discharge circuit for the main generator field windings including a resistor connected in shunting relation with the main generator field windings, an auxiliary generator, circuit means connecting the auxiliary generator between the connection between the main generator field windings and a point intermediate the ends of the discharge resistor, a pilot generator, means connecting the auxiliary generator to be excited by the pilot generator, and means for exciting the pilot generator in amount and polarity dependent upon the amount and direction of variation of the loads on the generators from a predetermined ratio.

8. In a control system for maintaining a predetermined load ratio between a plurality of dynamoelectric machines having main field windings comprising, a source of excitation for the main field windings, circuit means connecting said main field windings in series circuit relation to said source, a discharge resistor connected in parallel relation with said field windings, an auxiliary generator, circuit means connecting said auxiliary generator to said excitation circuit in parallel relation with both of said main field windings, said auxiliary generator having a field excitation winding individual to each dynamoelectric machine, said field excitation windings being connected in opposed relation, and circuit means connecting each of said field excitation windings to be energized in accordance with the load on its associated dynamoelectric machine to cause the auxiliary generator to develop a voltage of a polarity and value as determined by the variation from the predetermined load ratio of the dynamoelectric machines, whereby the excitations of the main field windings of the dynamoelectric machines are so varied in direction and amount as to maintain said predetermined load ratio therebetween.

9. A system for maintaining a predetermined load ratio between a pair of dynamoelectric machines connected to operate in parallel and each having a field winding comprising, a circuit for connecting said field windings in series circuit relation to a main source of excitation, means including an auxiliary generator connected in said circuit operable to simultaneously vary the excitation of said field windings inversely dependent upon the polarity of said auxiliary generator and independently of the main source of excitation, said auxiliary generator having a pair of opposed field windings individually connected to be energized in accordance with the load currents of the dynamoelectric machines to cause said auxiliary generator to develop a potential of a polarity and value dependent upon a variation in the load ratio of the machines, a variable resistor connected in series circuit relation with the auxiliary generator, and means for selectively varying the resistance of at least one of the field winding circuits of the auxiliary generator to vary the load ratio of the machines.

10. In a control system for a pair of dynamoelectric machines each having a field winding, an energizing circuit for the field windings of said machines, said field windings being connected in series circuit relation in said energizing circuit, an auxiliary generator, circuit means including a discharge resistor common to both field windings connecting the auxiliary generator to said excitation circuit for selectively increasing the excitation of one of the machines while decreasing the excitation of the other machine in accordance with the polarity of the potential of the auxiliary generator, and means for variably exciting the auxiliary generator from the dynamoelectric machines to cause it to develop a potential having a polarity and a value dependent upon the variation in load ratio of the said machines from a predetermined ratio.

11. In a control system for a pair of main generators each having a field winding, a source of excitation for said field windings, circuit means connecting said field windings in series circuit relation to said source, an auxiliary generator having a pair of opposed field windings, circuit means including a discharge resistor connected across both of said field windings connecting the auxiliary generator to said excitation circuit for selectively increasing the excitation of one of the main generators while decreasing the excitation of the other main generator in accordance with the polarity of the auxiliary generator, and circuit means individually connecting said opposed field windings to the load circuits of the generators for exciting the auxiliary generator with a polarity and to a degree dependent upon any variation in the load ratio of the main generators from a predetermined load ratio.

12. A system for maintaining a predetermined load ratio between a pair of dynamoelectric machines connected to operate in parallel and each having a field winding comprising, circuit means for connecting the field windings of said machines in series circuit relation to an excitation source, variable resistor means connected in said circuit means for varying the excitation current of said field windings, a discharge resistor connected across said field windings, an auxiliary generator connected in a bridging circuit between the discharge resistor and to the circuit connection between the field windings, said auxiliary generator having a pair of opposed field windings individually connected to be excited in accordance with the load currents of the pair of machines to cause said auxiliary generator to develop a potential of a value and potential dependent upon variations in the load ratio of the machines, and variable resistance means connected to the bridging circuit of the auxiliary generator for adjusting the effect of the potential developed by the auxiliary generator upon the field windings of the machines.

13. In a control system for a pair of motors having field windings, circuit means for connecting said field windings in series circuit relation to a current source, an auxiliary generator having opposed field windings, circuit means connecting the auxiliary generator in parallel circuit relation with said field windings to selectively increase the excitation of one while decreasing the excitation of the other of the motors in accordance with the amount and polarity of the potential of the auxiliary generator, circuit means individually connecting the field windings of the auxiliary generator to be excited in accordance with the load currents of the motors for causing said auxiliary generator to develop a potential of a value and polarity dependent upon the amount and direction of the variation of the loads on the motors from a predetermined load ratio, and a variable resistor connected in the excitation circuit of each of the field windings of the auxiliary generator.

14. In a control system for a pair of main generators, a first auxiliary generator, a second auxiliary generator having a pair of opposed field windings, circuit means whereby the second auxiliary generator excites the first auxiliary generator, circuit means connecting the first auxiliary generator for selectively increasing the excitation of one while decreasing the excitation of the other of the main generators in accordance with the polarity and degree of excitation of the first auxiliary generator, means connecting the opposed field windings of the second auxiliary generator to be energized in accordance with the load currents of the main generators to cause the second auxiliary generator to develop a potential having a polarity dependent upon which of the main generators is carrying a greater amount of load relative to the load on the other generator as determined by a predetermined load ratio and a value depending upon the amount of variation of the loads of the main generators from said predetermined load ratio, and variable resistor means connected in circuit relation with the first auxiliary generator for varying its effect upon the excitations of the main generators.

RALPH H. WRIGHT.
EARL C. WATSON.